April 18, 1967     A. L. TROUTNER     3,314,209
COMPOSITE TRUSS JOIST HAVING CHORDS
AND LINKS OF ADJUSTABLE ANGLE
Filed April 12, 1965
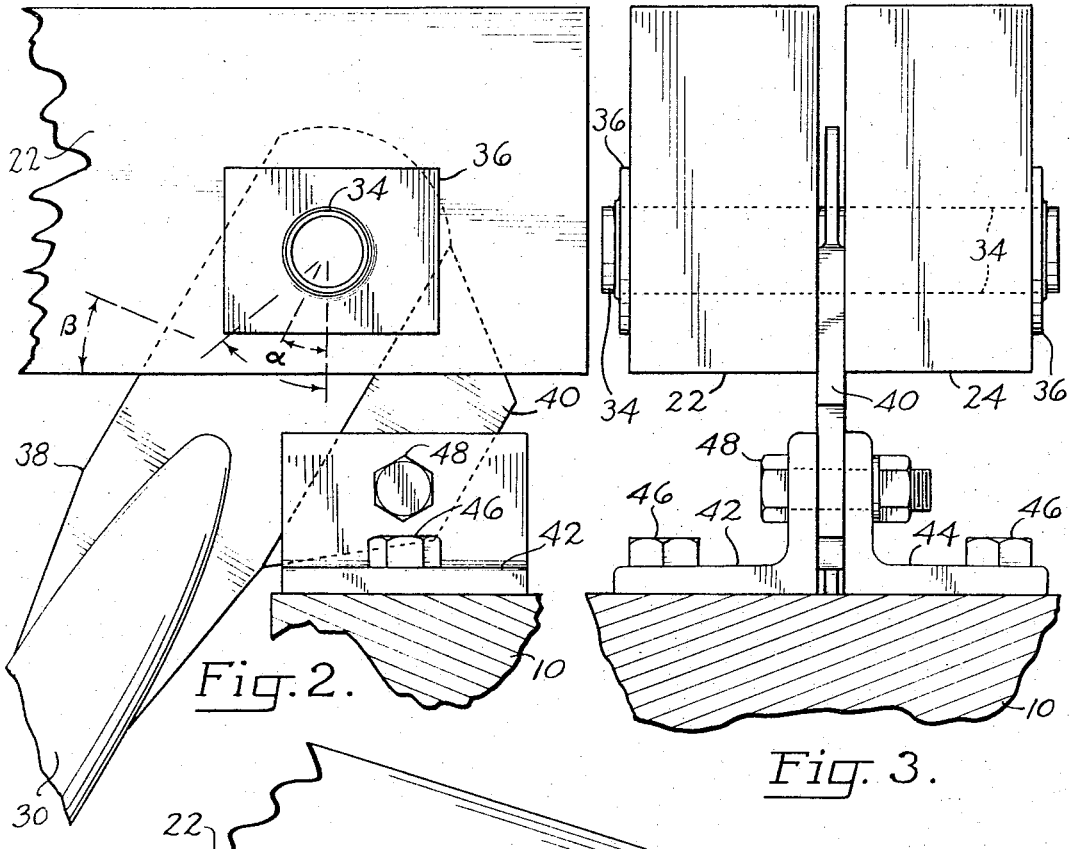
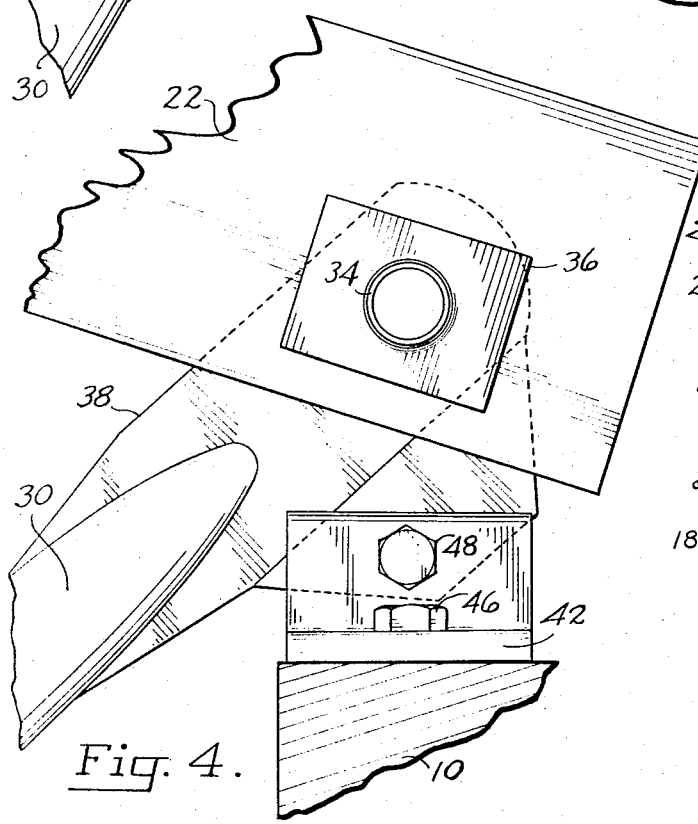
Arthur L. Troutner
INVENTOR
BY *Eugene D. Farley*
*Atty.*

United States Patent Office 3,314,209
Patented Apr. 18, 1967

3,314,209
COMPOSITE TRUSS JOIST HAVING CHORDS
AND LINKS OF ADJUSTABLE ANGLE
Arthur L. Troutner, P.O. Box 1496, Boise, Idaho 83701
Filed Apr. 12, 1965, Ser. No. 447,476
5 Claims. (Cl. 52—639)

This invention is a continuation-in-part of my copending application Ser. No. 334,705, filed Dec. 31, 1963, for Long-Span, High-Load, Composite Truss Joist.

This invention relates to truss joists of the class comprising vertically spaced chords interconnected by a plurality of link members arranged in zig-zag disposition between the chords.

It is the general object of the present invention to provide a composite truss joist of the class described wherein various truss joist configurations such as a parallel configuration, a pitched configuration or a tapered configuration may be achieved using similar component parts adjusted in a manner predetermined to construct a joist of the desired configuration.

It is another object of the present invention to provide a composite truss joist which is strong and capable of supporting heavy loads over long spans.

It is another object of this invention to provide a composite truss joist which may be assembled from ordinary lumber and metal tubing; which is light in weight; and which is erected easily on the building site without the necessity of using power equipment.

It is another object of this invention to provide a composite truss joist which may be mounted on various bearing support members, such as bearing walls of concrete, wood or masonry and cross beams of wood or steel.

It is another object of the present invention to provide a composite truss joist comprising upper and lower chords and interconnecting link members in which the chords and links may be arranged at desired angles relative to each other.

In the drawings:

FIG. 1 is a fragmentary view in elevation of the herein described composite truss joist of adjustable angle in one of its applications;

FIG. 2 is a fragmentary view in side elevation of the composite truss joist of the invention with the chords arranged parallel to each other, illustrating the manner of attachment of the upper chord to an underlying support surface;

FIG. 3 is an end elevation of the composite truss joist of FIG. 2; and

FIG. 4 is a fragmentary view in side elevation, similar to FIG. 2, illustrating the composite truss joist with the upper and lower chords arranged at an angle to each other.

As shown in FIG. 1, the truss joists of my invention are supported in parallel spaced arrangement between a pair of support members such as bearing walls 10. The bearing walls may be of wood, concrete or masonry. A stabilizing strip 14 is mounted on the inside surface of each bearing wall.

Each joist is composed of an upper chord, indicated generally at 16 and a lower chord indicated generally at 18. Upper chord 16 is longer than lower chord 18. Its ends overlie and are supported by bearing wall 10. Lower chord 18 is nailed or otherwise fastened to stabilizing strip 14.

To build a strong joist, each of chords 16, 18 is a composite of two structural pieces placed side by side parallel to each other and spaced apart horizontally to provide an intermediate space of sufficient width to accommodate links by means of which they are interconnected.

Thus upper chord 16 may be a composite of 2 x 6 pieces 22, 24 placed on edge. Similarly lower chord 18 may be a composite of 2 x 4 pieces 26, 28 placed on edge.

Upper chord 16 and lower chord 18 are interconnected by a lacing of terminal link members 30 and central link members 32 arranged in zig-zag fashion. Each link member may comprise a metal tube having transversely perforated flattened ends. The latter are of such thickness that when overlapped they may be inserted in the space between the pieces comprising each chord, as shown particularly in FIG. 3.

At spaced, offset intervals the upper and lower chords are cross bored to form openings which register with the perforations through the flattened ends of the link members. Pins 34 are inserted through the registering openings to interconnect the link members and chords, as well as to secure together the component pieces of each chord. They are locked in place by press-on, friction grip washers 36.

The terminal ends of terminal link members 30 are secured to upper chord 16 and have a special construction which makes it possible to achieve the purposes of the invention. This construction is illustrated particularly in FIGS. 2 and 3.

The terminal end of each link 30 is formed with a perforated, flattened portion 38. The flattened portion in turn is formed with an inwardly directed lateral extension 40 which projects inside the plane of the lower edge surface of the upper chord. Extension 40 may comprise a flat plate, trapezoidal in configuration, with its base welded to the longitudinal side edge of flattened end 38 of link 30.

Pivotal connecting means are provided for connecting plate extension 40 to structural member 10. Such means broadly comprise a standard secured to member 10 and pin means interconnecting the standard and the plate extension.

In the illustrated form of the invention the standard comprises a pair of angled bearing plates 42, 44. Each plate comprises two segments including a base segment and an upright segment formed at right angles to each other.

As shown in FIG. 3, the bearing plates may be mounted on structural member 10 in spaced apart, cooperating relation by means of bolts or screws 46.

The upright segment of each bearing plate is apertured, the apertures being placed in registration with each other and with the perforation through extension 40. The members then may be pivotally connected by means of a pivot pin or bolt 48.

It will be apparent from the foregoing that various joist configurations may be achieved merely by varying the angular relation of the joist components to each other.

Thus, as shown in FIG. 2, various link angles (alpha) with respect to the chords may be achieved merely by pivoting terminal link 30 about pivot pin 48. Similarly, various angular positions (beta) of the upper chord with reference to the lower chord may be obtained merely by pivoting the upper chord about its mounting pin 34, the lengths of the various connecting links being determined accordingly as shown in FIG. 1.

There thus is provided a truss joist assembly which is universal in its applicability to the construction of truss joists of parallel, pitched or tapered configuration, of long or short span, mounted upon a wide variety of support members.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:
1. A composite truss joist comprising

(a) upper and lower chords dimensioned to span spaced support surfaces, (b) a plurality of links arranged in zig-zag relation between the chords with the upper terminal end of each terminal link being disposed adjacent the upper chord, (c) first pivotal connecting means pivotally interconnecting the links and chords, (d) the upper terminal end of each terminal link being formed with an inwardly directed lateral extension projecting inside the plane of the lower edge surface of the upper chord, (e) a pair of standards adapted to be mounted one on each support surface, and (f) second pivotal connecting means pivotally interconnecting each terminal link extension and one of the standards on an axis parallel to and spaced from the first pivotal connecting means.

2. A composite truss joist comprising (a) upper and lower chords dimensioned to span spaced support surfaces with the upper chord overlying said surfaces, (b) each chord comprising a pair of horizontally spaced structural members, (c) a plurality of links having flattened ends arranged in zig-zag relation with the flattened ends overlapping and placed between the structural members, (d) pins means pivotally interconnecting the link ends and structural members, (e) the terminal end of each terminal link being provided with an inwardly directed lateral extension projecting inside the plane of the lower edge surface of the upper chord, (f) a pair of standards adapted to be mounted one on each support surface, (g) each standard comprising a pair of bearing plates horizontally spaced from each other and each comprising a base portion and an upstanding portion, (h) the upstanding portions receiving the lateral extension between them, (i) and pivot pin means pivotally interconnecting each extension and its associated bearing plates.

3. A composite truss joist comprising (a) upper and lower chords dimensioned to span spaced support surfaces with the upper chord overlying said surfaces, (b) a plurality of links fastened in zig-zag relation between the chords with the terminal end of each terminal link being fastened to the upper chords, (c) the terminal end of each terminal link being formed with an inwardly directed lateral extension projecting inside the plane of the lower edge surface of the upper chord, (d) a pair of standards adapted to be mounted one on each support surface, (e) pivotal connecting means pivotally interconnecting each terminal link extension and one of the standards, and (f) pivotal mounting means pivotally connecting the terminal end of each terminal link to the upper chord.

4. A composite truss joist comprising (a) upper and lower chords dimensioned to span spaced support surfaces with the upper chord overlying said surfaces and comprising a pair of horizontally spaced structural members, (b) a plurality of links having flat ends inserted between the structure members and fastened in zig-zag relation between the chords with the terminal end of each terminal link being fastened to the upper chord by pivot pin means penetrating the structural members and the flat end of the terminal link, thereby pivotally connecting it to the upper chord, (c) the terminal end of each terminal link being formed with an inwardly directed lateral extension projecting inside the plane of the lower edge surface of the upper chord, (d) a pair of standards adapted to be mounted one on each support surface, and (e) pivotal connecting means pivotally interconnecting each terminal link extension and one of the standards.

5. A composite truss joist comprising (a) two vertically spaced chords dimensioned to span two horizontally spaced bearing walls with the lower chord in bearing contact therewith, (b) each chord comprising two juxtaposed structural pieces placed side by side, parallel to each other, (c) a plurality of links arranged in zig-zag relation between the chords with the ends of adjacent links overlapped and extending between the structural pieces comprising the chords and with the terminal ends of the terminal links being inserted between the structural pieces comprising the lower chord, (d) there being registering openings through the pieces and the link ends, (e) pin means penetrating the registering openings, securing the links to each other and to the pieces, (f) two pairs of standards adapted to be mounted one pair on each of the bearing walls outside the pieces, (g) first securing means for securing the standards to the bearing walls, and (h) second securing means for securing the standards to the pieces.

References Cited by the Examiner

UNITED STATES PATENTS 3,062,340 11/1962 Hunnebeck _____ 52—640
3,062,340 11/1962 Hunnebeck _____ 52—640

FRANK L. ABBOTT, *Primary Examiner.*

R. A. STENZEL, *Assistant Examiner.*

UNITED STATES PATENT OFFICE
CERTIFICATE OF CORRECTION

Patent No. 3,314,209                                         April 18, 1967

Arthur L. Troutner

It is certified that error appears in the above identified patent and that said Letters Patent are hereby corrected as shown below:

Column 4, line 38, "lower" should read -- upper --; line 52, "3,062,340    11/1962    Hunnebeck ------- 52-640" should read -- 1,163,641    12/1915    Cummings --------- 52-640 --.

Signed and sealed this 31st day of March 1970.

(SEAL)
Attest:

Edward M. Fletcher, Jr.                           WILLIAM E. SCHUYLER, JR.
Attesting Officer                                          Commissioner of Patents